Sept. 27, 1927.  
E. T. BLACK  
1,643,693  
MECHANICAL MOVEMENT  
Filed Aug. 18, 1924   3 Sheets-Sheet 1

Inventor  
E. T. Black  
By Paul B. Eaton  
Attorney

Sept. 27, 1927.  E. T. BLACK  1,643,693
MECHANICAL MOVEMENT
Filed Aug. 18, 1924   3 Sheets-Sheet 2

Inventor
E.T. Black
By
Attorney

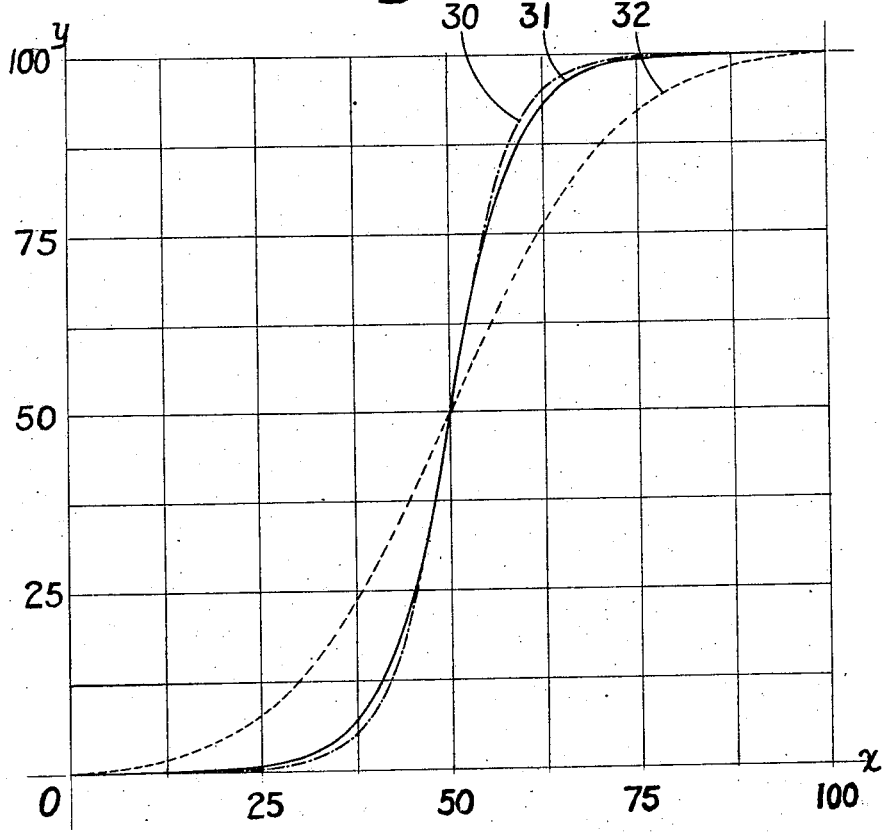

Patented Sept. 27, 1927.

1,643,693

UNITED STATES PATENT OFFICE.

EDGAR T. BLACK, OF WINSTON-SALEM, NORTH CAROLINA.

MECHANICAL MOVEMENT.

Application filed August 18, 1924. Serial No. 732,758.

My invention relates to mechanical movements, and more especially to that type of mechanical movements known as "Geneva movements".

An object of the invention is to convert a constant rotary motion into an intermittent rotary motion in which there is a relatively long pause between the intermittent motions.

Another object of the invention is to provide a new and useful compounding of Geneva movements so as to produce a series of intermittent motions in which there will be a relatively long pause between the intermittent motions, and an intermittent motion which is swift, yet possessing a low velocity at the beginning, and a high velocity at the middle of the movement, and a low velocity at the end of the movement.

A still further object of invention is to provide an intermittent motion adapted to be used where a swift motion is desired, yet one in which there is a minimum amount of shock imparted to the member desired to be moved, both at the beginning of the movement and at the end of the movement.

Another object of invention is to provide for the compounding of two Geneva movements, the driven member in the first Geneva movement acting as the driving member in the second Geneva movement.

Another object of invention is to provide for the compounding of a plurality of Geneva movements to obtain a desired intermittent rotary movement.

Figure 1:
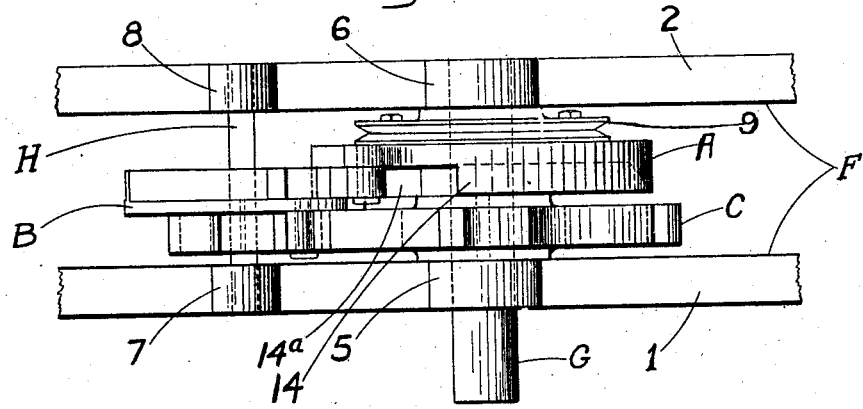
Figure 2:
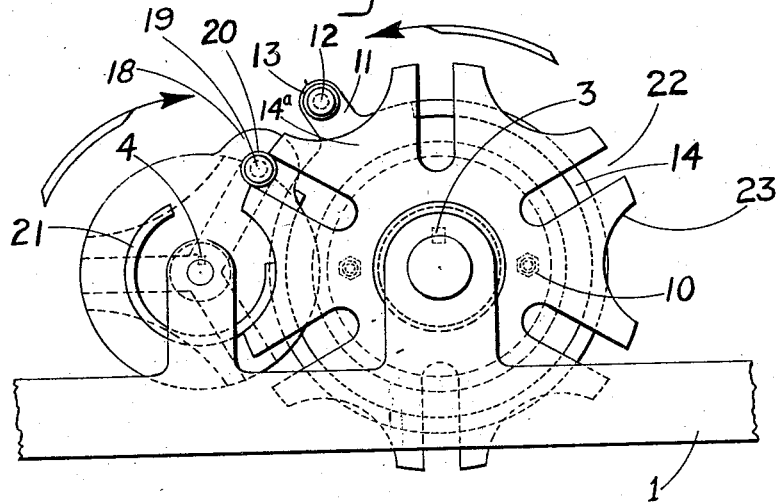
Figure 3:
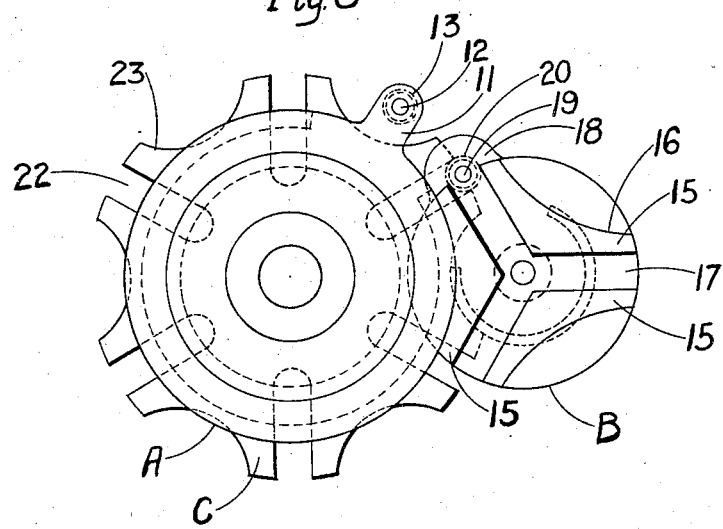
Figure 4:
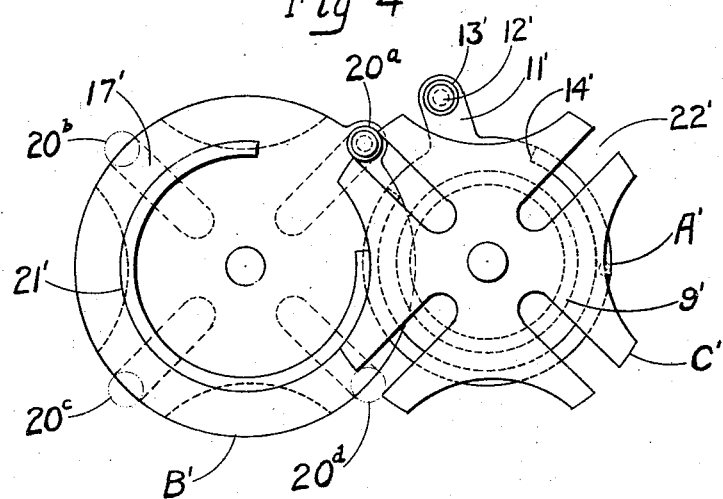

A brief description of the drawings follows:

Figure 1 is a plan view of my device;
Figure 2 is a front elevation of my device, showing the rear portion in dotted lines.
Figure 3 is a rear elevation of my device.
Figure 4 is a modification of my invention showing a combination of slots differing from the preceding figures.
Figure 5 shows different mechanical movements in a graphical manner.

Like numerals indicate corresponding parts thruout the drawings, in which 1 and 2 represent the side members of any suitable frame for the working parts of my device. In this frame F, the shafts G and H are mounted in suitable bearings 5, 6, 7, and 8, as shown in the drawings. On the shaft G the wheels A and C are mounted, the wheel A being loosely mounted on the shaft G, while the wheel C is fastened or keyed to the shaft G by means of a key 3 to rotate therewith. The wheel B is mounted on the shaft H, being secured thereon by means of the key 4.

The wheel A has a pulley or sprocket wheel 9 affixed to the side nearest the member 2. This wheel 9 may be made integral with the wheel A, or it may be made separate from the wheel A and affixed thereto by means of bolts 10 or any other suitable means. The wheel 9 need not be in the form of a pulley or sprocket wheel, but may be of any desired type for receiving power from a prime mover. The wheel 9 may be made so that it can receive power from a prime mover and also may contain a second portion or driving means for a power take-off (not shown).

The wheel A has an arm 11 mounted thereon or preferably made integral with the wheel A, and extending beyond the perimeter of the wheel A. This extending portion or arm 11 has a member 12 extending inwardly at right angles to the arm 11 and thus forms a bearing for the roller 13. The wheel A has an annular member 14 near the perimeter and extending at right angles from the inner face of the wheel. This annular member has a cutaway portion 14$^a$ in its perimeter adjacent to the arm 11, the purpose of which will be explained later.

The wheel B has a series of members 15 mounted on the side of the wheel nearest the member 2. These members 15 are preferably made integral with the wheel B. Each of the members 15 when applied to or made integral with the wheel B has two of its sides parallel to the radius of the wheel B, and the outer side 16 is concave in shape and conforms to the arc of a circle described with the center thereof being the center of the wheel A, as shown in Figure 3. This arc 16 has a slightly greater radius than the wheel A, and fits the annular member 14 snugly, when in contact therewith.

In the embodiment shown in Figures 1, 2, and 3 the wheel B has three such members 15, and when applied equidistant from each other to the side of the wheel B or made integral therewith form three slots 17 on the side of the wheel B, and also three concave portions 16.

The other side of the wheel B, or the side next to the frame member 1, has an arm 18 affixed thereto, or preferably made integral with the wheel B and consisting of a projection on the perimeter of the wheel B, similar to the arm or projection 11 on the wheel A. This arm or projection 18 has a bearing member 19 extending at right angles from the member 18, and has the roller 20 mounted thereon. An annular member 21 is made integral with the wheel B and occurs on the side of the wheel B nearest the frame member 1 and projects at right angles from the wheel B. This annular member 21 has a cut-away portion adjacent the arm or projection 18 and between the roller 20 and the center of the wheel B. This annular member fits snugly into the concave portions 23 in the wheel C and serves as a locking device to be later explained.

The wheel C, as before stated, is fixedly mounted on the shaft G and has a series of radial slots 22 therein, open at the outer end. In Figures 1, 2, and 3 six of these slots are shown, but it is to be understood that any desired number of slots may occur in the wheel C, also that any desired number of slots 17 may occur in the wheel B, and also any desired number of rollers 20 may be mounted on the wheel B. The slots 22 are adapted to receive the roller 20.

Between each of the slots 22 in the wheel C there is a concave portion 23 which is an arc of a circle with the center of the wheel B as the center. The purpose of this concave portion 23 will be set forth in the method of operation, but it may be stated here that the annular member 21 fits into the concave portion 23 and moves past it as the wheel B is rotated. This serves to lock the wheel C against rotation, except when the cut-away portion of this annular member is in conjunction with the concave surface, which occurs when the roller 20 is traversing one of the slots 22 in the wheel C.

I have thus described a preferred embodiment of my invention, but it is to be understood that any desired number of slots 17 may occur on the wheel B, and also that any desired number of rollers 20 may be mounted on the wheel B. It is also to be understood that any desired number of slots 22 may occur in the wheel C, but in case of a plurality of rollers 20 on the wheel B the annular rim 21 would have to be broken away adjacent each roller, and in case of three rollers on the wheel B the rim 21 would be discarded.

In Fig. 4 I have shown a combination of slots differing from the preceding figures merely to show that I may depart from the arrangement of slots and rollers as shown in the preceding figures without departing from the scope of my invention. In the embodiment shown in figure 4 I provide the wheel A' with an arm or projection 11', with a roller 13', though I desire it to be understood that a plurality of rollers 13' may be mounted on the wheel A' of my device, and in such case the annular rim would be discarded or broken away at other points.

The wheel B' in Fig. 4 has four slots 17'. I also show a plurality of rollers $20^a$, $20^b$, $20^c$, and $20^d$, it being understood that any desired number of these rollers may be mounted on the wheel B' or B as the case may be, but in such case the annular rim would be broken away or discarded as the case would necessitate.

In Fig. 4 I have shown the wheel C' with four slots 22' instead of six as shown in the preceding figures. The working parts in Fig. 4 are practically the same as in the preceding figures, except in the number of slots and rollers contained by the wheels.

In Figure 5 relative mechanical movements are shown. In this figure the abscissæ $x$ of the curves 30 and 31 represent the uniform angular motion of the driving members A and A' respectively, while the ordinates $y$ of these curves represent the corresponding angular motion of the driven members C and C', respectively, resulting therefrom. The abscissæ for curve 32 represent the uniform angular motion of the driving member of a simple Geneva stop movement (having four slots), while the ordinates represent the corresponding angular motion of the driven member of same resulting therefrom.

The numeral 30 is the graph for the movement resulting from the mechanical device shown in Figs. 1, 2, and 3. The numeral 31 is the graph for the movement resulting from the use of the device shown in Fig. 4. The numeral 32 is the graph for a simple Geneva stop movement, having four slots, and it is placed on the drawing for comparison.

It is apparent that I have produced a movement in which there is a relatively long pause between the movements, and one in which the velocity of the movement is low at the beginning and at the end of the movement, but rapid in the middle of the movement. For sake of comparison, let us take a time when 25 per cent of the time for the movement has elapsed. At this time, as shown on the graph, less than one per cent of the movement will have been completed. Or let us take a time when 37½ per cent of the time for the completion of the movement will have elapsed. The graph will show that at this point of time approximately only 7 per cent of the movement will have been completed. After this point is reached the rise of the graph 30 will be rapid until the middle of the movement is reached, when the last half of the curve 30 is reversely identical with the first half.

Thus I have shown a means for producing a movement in which the driven member C will be motionless approximately 94½ per cent of the time, and in motion approximately 5½ per cent of the time, and at the same time giving a movement that is rapid, yet free from shock. This type of movement is highly desirable in conveyers, and many other machines.

It is apparent that this mechanical movement is capable of application in many machines where it is desired that the member to be conveyed remain stationary in a given place for a given time, and in which it is desired that the member desired to be conveyed shall be removed from its stationary position as quickly as possible. Yet, in this quick movement, it is highly desirable that the member or article conveyed should not receive any great amount of shock at the beginning and at the end of the movement. The purpose of my mechanical movement is to apply force very gradually to the member desired to be moved, yet to increase that force rapidly after the conveyed member has been started in its motion. This movement is very rapid in the middle of the progress thereof but is very slow at the beginning and end thereof. This is highly desirable in many machines, and I believe that this will accomplish a movement that is new and useful.

It might be stated at this point that the arrangement of the wheels A, B, and C may be varied as to position, as the wheels A and B do not have to be mounted on the same shaft G, but one of them may be mounted on a third shaft, and yet perform the same movements as set forth in the description.

The method of operation of my device is as follows:

Power is applied to the wheel 9, which is a part of the wheel A. This causes the wheel A to rotate. The roller 13 enters the slot 17 and proceeds into said slot to a point in close proximity to the shaft H. This entrance of the roller 13 into the slot 17 causes at first slight rotative movement of the wheel B which increases gradually and more rapidly as the roller approaches the shaft H. When the roller 13 has reached a point located on a line drawn between the shafts G and H it immediately recedes from the slot 17, thereby causing a rapid rotation of the wheel B, but this gradually decreases until the roller 13 emerges from the slot 17, and thus will have caused a one-third revolution of the wheel B. Suppose the wheels A, B, and C are in the position shown in Figure 2. Here the roller 13 is about to engage and enter one of the slots 17, and the roller 20 on wheel B is about to engage and enter one of the slots 22 in the wheel C. When the roller 13 enters and traverses into and out of the slot 17 this will have caused a one-third rotation of the wheel B, and will have caused the roller 20 to have traversed the slot 22 inwardly and outwardly, and will have caused a one-sixth rotation of the wheel C, and the annular member 21 will have come into engagement with the concave portion 23 of the wheel C and will act as a locking device against rotation of the wheel C.

The annular member 14 serves as a locking device against the rotation of the wheel B except when the arm 11 is near the slot 17, and while the roller 13 is traversing the slot 17 the ends of the member 15 will enter the cut-away portion 14ᵃ in the wheel A.

The second revolution of the wheel A will cause the roller 13 to enter another slot 17 in the side of the wheel B and will cause a one-third rotation of the wheel B, but this will not impart any movement to the wheel C. The next revolution of the wheel A will cause the roller 13 to enter another of the slots 17 and impart another one-third revolution to the wheel B, but this too will not impart any movement to the wheel C, while the fourth movement imparted to the wheel B will cause the roller 20 to enter another slot 22 in the wheel C, and at the same time the annular rim 21 will be in position to allow the rotation of the wheel C. This fourth movement imparted to the wheel B will thus cause another one-sixth revolution of the wheel C. As long as power is applied to the machine this series of movements will continue, and thus the constant rotary motion will be converted into an intermittent rotary motion which will be slow at the beginning and end, but one which will be rapid in the middle of the movement.

The operation of the device would be somewhat different if the wheel B had more than one roller 20 mounted thereon, such as the rollers 20ᵃ, 20ᵇ, 20ᶜ, and 20ᵈ shown in Fig. 4. If there were rollers adjacent to every slot 17 on the wheel B, then movement would be imparted to the wheel C by every part rotation of the wheel B.

It is apparent that in looking at Fig. 2 the wheels A and C will rotate on a counter-clockwise direction, while the wheel B will rotate in a clockwise direction.

Having thus described my invention in the preferred forms, I desire it to be understood that changes may be made in the structure of the device as may fall within the scope of the appended claims.

What I claim and desire to secure by Letters Patent is:

1. In a mechanical movement, a rotary member, a second rotary member intermittently driven by the first-named rotary member, and a third rotary member intermittently and directly driven by the second rotary member, all of said driving connections being of the Geneva stop type.

2. In a device of the class described, a circular member mounted at its center for rotation, an annular rim adjacent its perimeter, adapted to engage a second circular member; a roller mounted on a projection extending radially outward from the perimeter of the circular member, a second circular member having radial slots therein adapted to receive the roller, a third rotary member, a roller on the side of the second circular member opposite the slots, adapted to enter into engagement with slots in the third rotary member.

3. In a mechanical movement, a framework, two parallel shafts mounted in the framework, a constantly driven rotary member loosely mounted on the first shaft, a second rotary member fixedly secured on the second shaft and adapted to be intermittently driven by the constantly driven rotary member, a third rotary member fixedly secured on the first shaft and adapted to be intermittently driven by the second rotary member, the constantly driven rotary member having an annular member thereon adapted to fit into concave portions of the second rotary member, an annular rim mounted on the second rotary member and adapted to enter into concave portions on the third rotary member, said annular rims having portions broken away, the annular rims acting as devices for locking the rotary members against rotation for a portion of the time consumed in the revolution of the first rotary member.

4. In a mechanical movement a second rotary member, a third rotary member, a constantly driven rotary member having a roller mounted thereon adapted to enter successively into a plurality of radial slots in the side of the second rotary member, and to traverse said slots inwardly and outwardly, and impart an intermittent rotary motion thereto, a plurality of rollers mounted on the second-named rotary member adapted to enter successively into a plurality of slots in the third rotary member and to traverse said slots inwardly and outwardly, and thus impart an intermittent rotary motion to the third rotary member, all of said slots being open at their outer ends.

In witness that I claim the foregoing as my own, I have hereunto affixed my signature this the 16th day of August, 1924.

EDGAR T. BLACK.